United States Patent
Chen et al.

(10) Patent No.: US 7,045,258 B2
(45) Date of Patent: May 16, 2006

(54) COLOR FILTER AND MANUFACTURING METHOD THEREOF

(75) Inventors: Wei-Hsiao Chen, Tainan (TW); Meng-Hsun Hsieh, Tainan (TW)

(73) Assignee: Himax Technologies Inc., Hsinhua (TW)

( * ) Notice: Subject to any disclaimer, the term of this patent is extended or adjusted under 35 U.S.C. 154(b) by 0 days.

(21) Appl. No.: 11/148,460

(22) Filed: Jun. 9, 2005

(65) Prior Publication Data

US 2005/0284393 A1  Dec. 29, 2005

(30) Foreign Application Priority Data

Jun. 23, 2004  (TW)  .............................. 93118186 A

(51) Int. Cl.
*G02B 5/20* (2006.01)
*G02F 1/1335* (2006.01)

(52) U.S. Cl. .......................................... 430/7; 430/396

(58) Field of Classification Search .................... None
See application file for complete search history.

(56) References Cited

U.S. PATENT DOCUMENTS

2005/0019679 A1\* 1/2005 Lo et al. ........................ 430/7
2005/0250021 A1\* 11/2005 Chen et al. .................... 430/5

\* cited by examiner

*Primary Examiner*—John A. McPherson
(74) *Attorney, Agent, or Firm*—Thomas, Kayden, Horstemeyer & Risley

(57) ABSTRACT

A color filter comprising first filtering units, second filtering units, and third filtering units is provided. The first filtering unit is manufactured according to a number of first pattern of a first mask, wherein each of the first patterns comprises a first main pattern portion and a number of first compensating portions. The second filtering unit is manufactured according to a number of second patterns of the second mask. The first compensating portions enable each first filtering unit to be smoothly coupled with the adjacent second filtering unit.

23 Claims, 6 Drawing Sheets

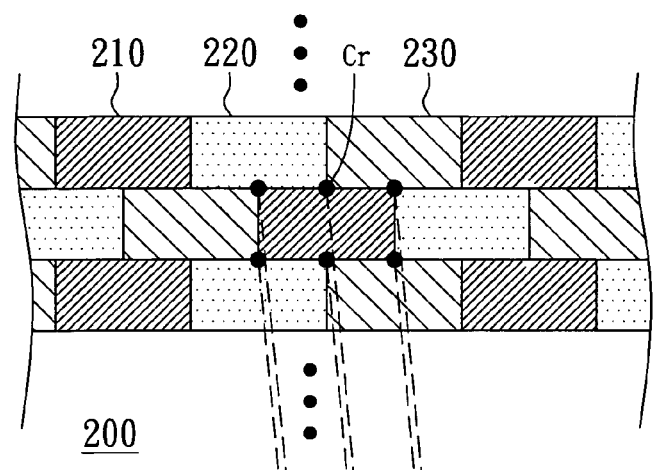
FIG. 2A
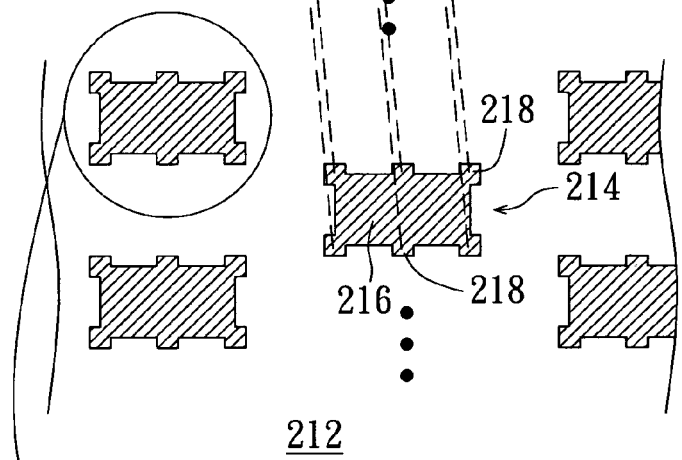
FIG. 2B
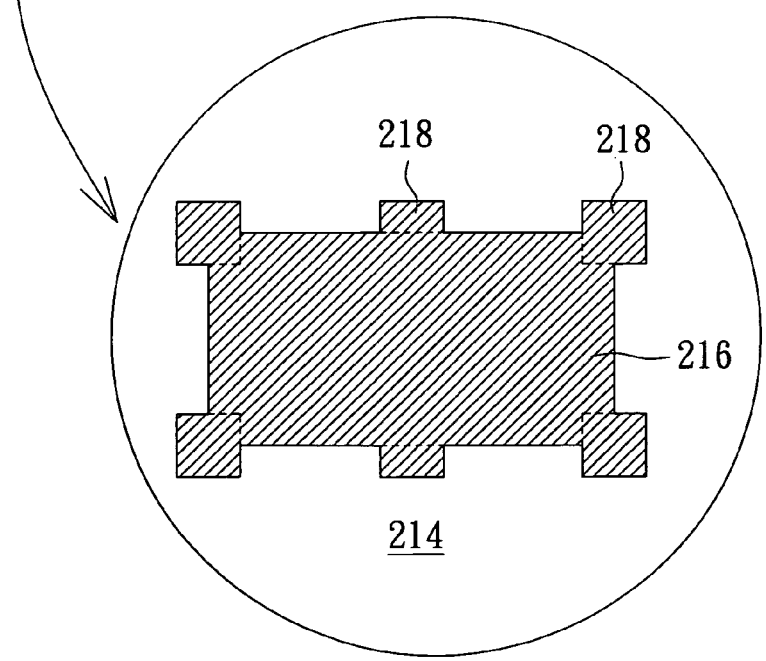

US 7,045,258 B2

COLOR FILTER AND MANUFACTURING METHOD THEREOF

This application claims the benefit of Taiwan application Ser. No. 93118186, filed Jun. 23, 2004, the subject matter of which is incorporated herein by reference.

BACKGROUND OF THE INVENTION

1. Field of the Invention

The invention relates in general to a color filter and manufacturing method thereof, and more particularly to a color filter using optical proximity correction (OPC) technology and manufacturing method thereof.

2. Description of the Related Art

With the features of light weight, low power consumption and small volume, liquid crystal display (LCD) has gradually replaced CRT display and is now widely applied in electronic devices such as a notebook computer, personal digital assistant (PDA), mobile phone and liquid crystal TV. The design of color filter, an essential part to an LCD, greatly affects the quality and efficiency of the LCD.

Referring to FIG. 1A, a top view of the structure of a conventional delta-type color filter is shown. The color filter 100 comprises a number of red filtering units 110, a number of green filtering units 120 and a number of blue filtering units 130. Any three adjacent filtering units 110, 120 and 130 are arranged in a triangle as shown in dotted triangles in FIG. 1A. Furthermore, the adjacent filtering units 110, 120 and 130 are arranged in an equal interval d. In actual manufacturing process, three different masks are used to sequentially form a red filtering unit 110, a green filtering unit 120 and a blue filtering unit 130 by lithography. Generally speaking, the filtering units 110, 120 and 130 are over-lapped (d≈0), and uneven surface easily occurs to the color filter 100 on the junctions of the filtering units 110, 120 and 130 as shown in FIG. 1B. The unevenness affects the characteristics of subsequent liquid crystal package.

When the interval d between the filtering units 110, 120 and 130 gradually increases to between 0.2 μm and 0.3 μm, the surface of the color filter 100 can have a best flatness. However, dimples occur at the corners of the filtering units 110, 120 and 130 as shown in the dotted circles in FIG. 1C. The dimples would cause abnormal liquid crystal arrangement in subsequent liquid crystal package, leading to "light leakage" during the operation of the LCD and largely affecting the quality and the efficiency of the LCD.

SUMMARY OF THE INVENTION

The invention provides a color filter and manufacturing method thereof, which performs optical proximity correction (OPC) on the mask pattern for forming the filtering unit, so that the filtering units are coupled flatly and tightly, not only avoiding dimples at the corner of the filtering units, but also improving the quality of the color filter and the efficiency in LCD assembly.

It is therefore an object of the invention to provide a color filter, comprising a number of first filtering units, a number of second filtering units, and a number of third filtering units. The first filtering unit is manufactured according to a number of first patterns of a first mask, wherein each first pattern comprises a first main pattern portion and a number of first compensating portions. The second filtering unit is manufactured according to a number of second patterns of a second mask. The first compensating portions enable each of the first filtering units to be smoothly coupled with the adjacent second filtering units.

It is therefore another object of the invention to provide a manufacturing method of the color filter. The manufacturing method comprises using a number of first patterns of the first mask to pattern a first photo-resist to form first filtering units, wherein each of the first patterns comprise a first main pattern portion and a number of first compensating portions, and using a number of second patterns of the second mask to pattern a second photo-resist to form second filtering units. The first compensating portions enable each of first filtering units to be smoothly coupled with the adjacent second filtering units.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 2A is a top view of a color filter according to a preferred embodiment of the invention;

FIG. 2B is a schematic diagram of the first mask patterns for forming the red filtering units in FIG. 2A;

DETAILED DESCRIPTION OF THE INVENTION

Figure 1A:
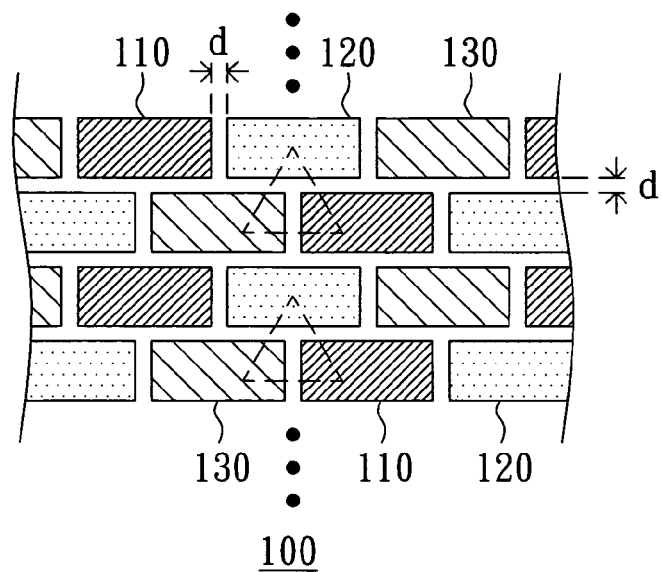
FIG. 1A is a top view of the structure of a conventional delta-type color filter.
Figure 1B:
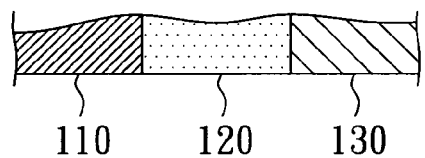
FIG. 1B is a schematic diagram illustrating an uneven surface formed on junctions of adjacent filtering units.
Figure 1C:
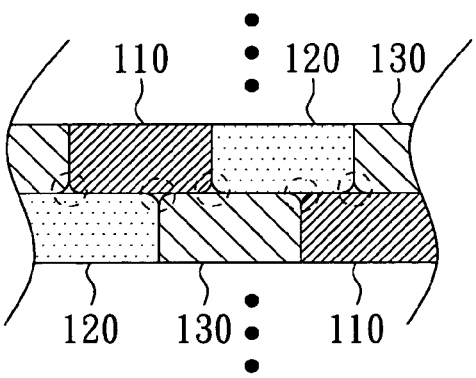
FIG. 1C is a schematic diagram illustrating dimples formed at the adjacent corners of adjacent filter units in a conventional color filter.

The feature of the color filter of the invention lies in applying optical proximity correction (OPC) technology to the manufacturing process of the color filter in the invention. The OPC is performed on the mask pattern of the filter to compensate the corner part of each filter, so that the adjacent corners of the filters can have a smooth coupling, not only improving the quality of the color filter but also increasing the efficiency in subsequent LCD assembly.

Referring to FIG. 2A, a top view of a color filter according to a preferred embodiment of the invention is shown. The color filter 200, which can be a delta-type color filter, comprises a number of red filtering units 210, a number of green filtering units 220 and a number of blue filtering units 230. In actual manufacturing process, the red filtering units 210 are manufactured according to a number of first patterns 214 of a first mask 212, wherein the first patterns 214 comprise a first main pattern portion 216 and a number of first compensating portions 218 as shown in FIG. 2B.

Figure 2C:
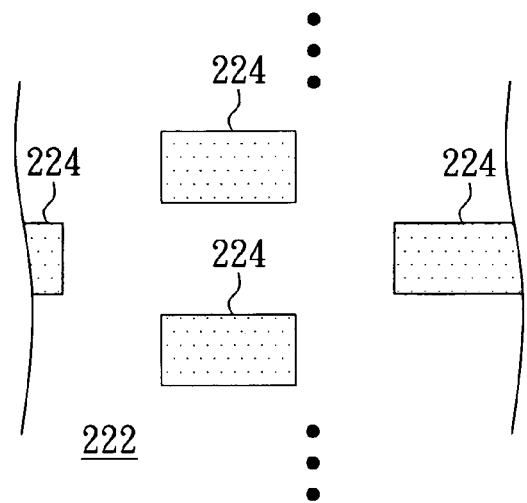
FIG. 2C is a schematic diagram of the second mask patterns for forming the green filtering units in FIG. 2A
Figure 2D:
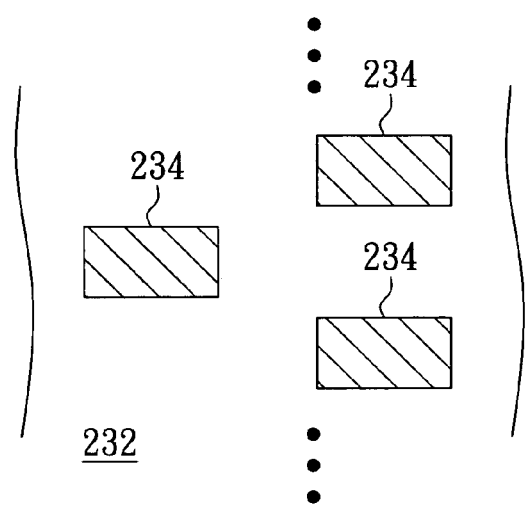
FIG. 2D is a schematic diagram of the third mask patterns forming the blue filtering units in FIG. 2A
Figure 2E:
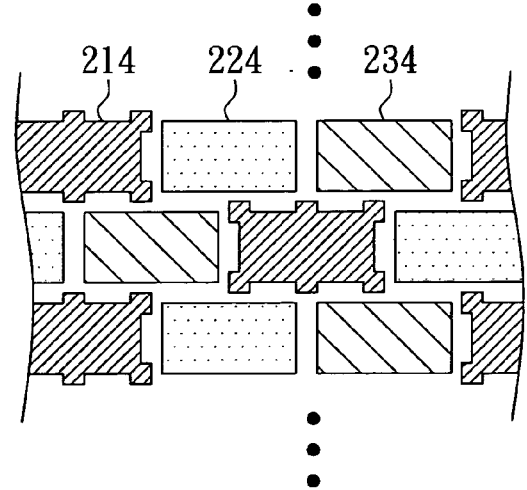
FIG. 2E is a diagram showing the relative positions of the first pattern, the second pattern and the third pattern when the first mask, the second mask and the third mask in FIG. 2B, FIG. 2C and FIG. 2D are overlapped.

The design of the first compensating portions 218 enables the first filtering unit 210 to be smoothly coupled with the adjacent second filtering unit 220 and the adjacent third filtering unit 230. The second filtering unit 220 is manufactured according to a number of second patterns 224 of a second mask 222 as shown in FIG. 2C. The blue filtering unit 230 is manufactured according to a number of third patterns 234 of a third mask 232 as shown in FIG. 2D. If the first, the second and the third masks 212, 222 and 232 are overlapped, the relative positions of the first, the second and the third patterns 214, 224 and 234 are as shown in FIG. 2E.

Figure 3:
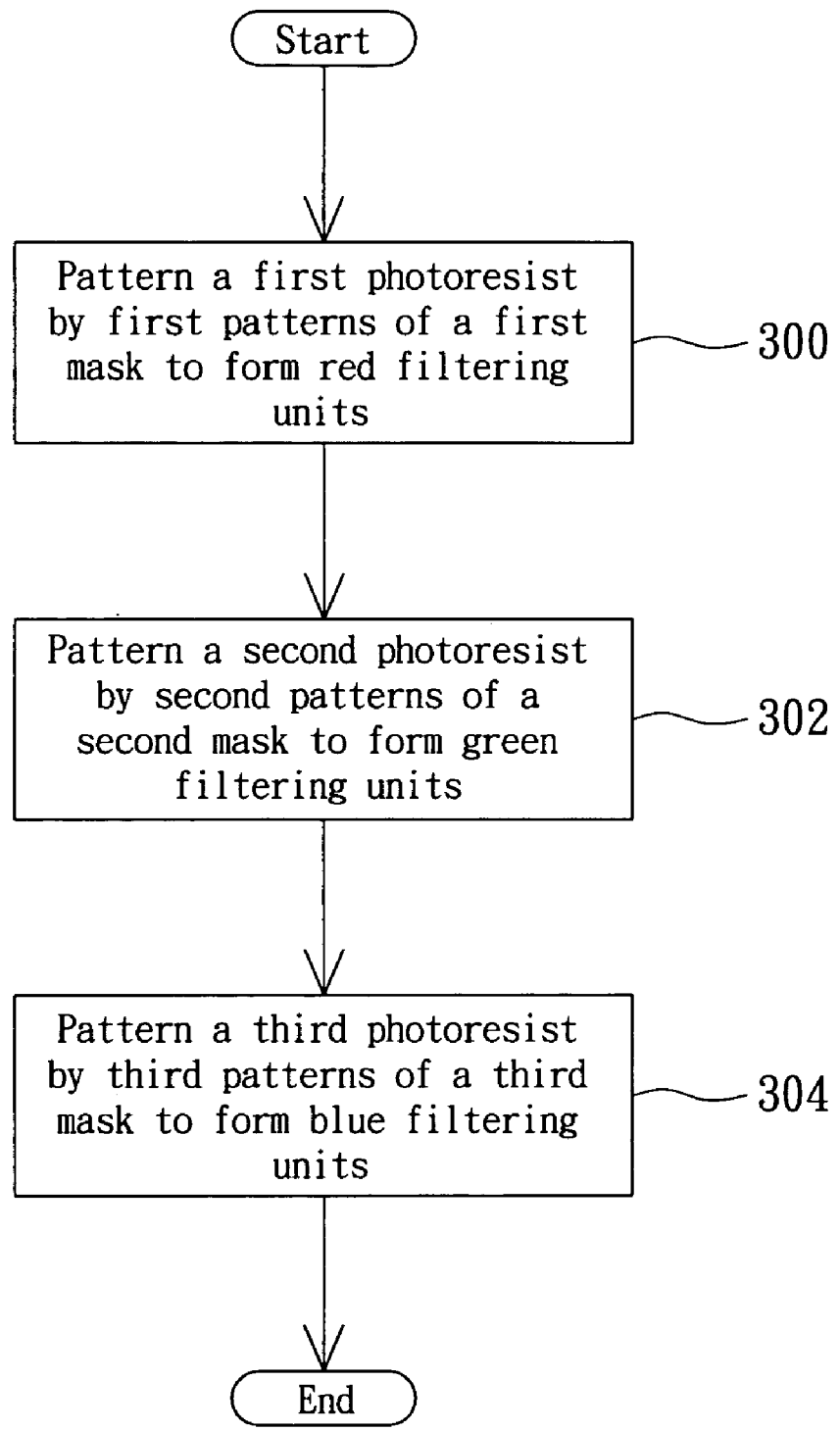
FIG. 3 is a manufacturing flowchart of a color filter according to a preferred embodiment of the invention.

Referring to FIG. 3, a manufacturing flowchart of a color filter 200 according to a preferred embodiment of the invention is shown. Firstly, in step 300, pattern the first photoresist (not shown in the figure) by the first patterns 214 of the first mask 212 to form red filtering units 210 of FIG. 2A in etching process. Next, proceed to step 302, pattern a second photoresist (not shown in the figure) by the second patterns 224 of the second mask 222 to from green filtering units 220 of FIG. 2A in etching process. Lastly, proceed to step 304, pattern a third photoresist (not shown in the figure) to form blue filtering units 230 of FIG. 2A in etching process. The first, the second, and the third photoresists are formed in a negative resist process.

Referring to both FIG. 2A and FIG. 2B, the first compensating portions 218, which project from the four corners and two opposite lateral sides of the corresponding first main pattern portion 216, can just compensate six corner contact points Cr of the red filtering unit 210, made by the first pattern 214, coupled to the adjacent green filtering unit 220 and the adjacent blue filtering unit 230, and six corner contact points Cr are illustrated in black dots. Therefore, each of the red filtering units 210 can be coupled smoothly with the adjacent green filtering unit 220 and the adjacent blue filtering unit 230. All of the six corner contact points Cr surrounding the red filtering units 210 include all of the corner contact points located at the junctions of the filtering units 210, 220, 230, so the design of the first compensating portion 218 enables a smooth coupling between the filtering units 210, 220 and 230. As for the second pattern 224 and the third pattern 226, no extra compensating portion is required as shown in FIG. 2C and FIG. 2D.

The compensating portion 218 disclosed above can be rectangular as in FIG. 2B or have any other shape. Since the compensating portions 218, projecting from the first main pattern portion 216, can compensate the six corner contact points Cr of the adjacent red filtering unit 210, green filtering unit 220 and blue filtering unit 230 to form smooth junctions, all these are not apart from the skill scope of the invention.

Despite the color filter 200 of the invention is exemplified by using the six compensating portions 218 of the first pattern 214 of the first mask 212 to compensate the six corner contact points Cr surrounding each red filtering unit 210, the invention is not limited thereto. The invention may also design six similar compensating portions on the second pattern 224 or the third pattern 234 to compensate the six corners contact points surrounding the green filtering unit 220 or the blue filtering unit 230 in FIG. 2A.

Figure 4:
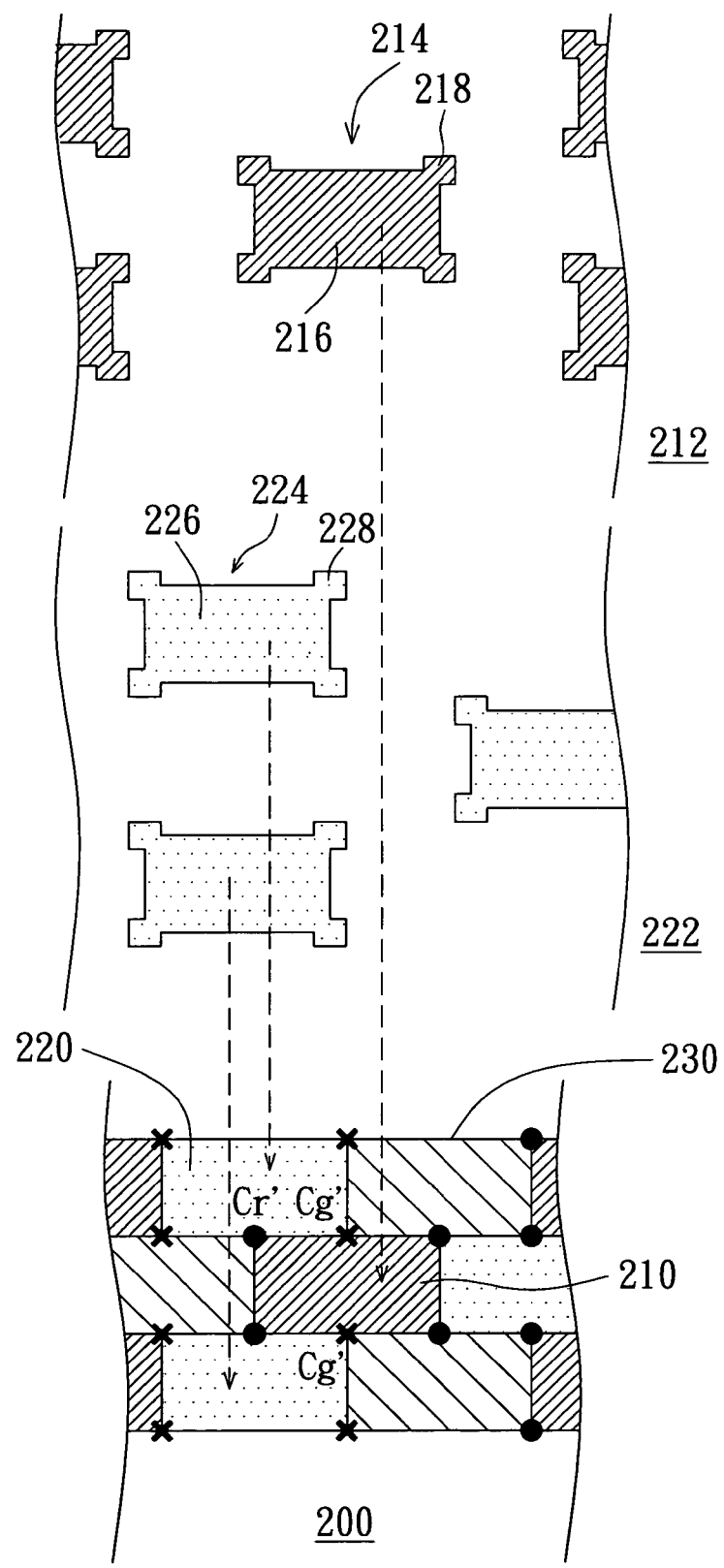
FIG. 4 is a schematic diagram of a color filter using first compensating portions of the first mask and second compensating portions of the second mask to achieve smooth junctions of adjacent filter units.

Alternatively, as shown in FIG. 4, each of first patterns 214 can only comprise four compensating portions 218 projecting from the corners of the first main pattern portion 216, while each of the second patterns 224 can comprise a second main pattern portion 226 and four second compensating portion 228 projecting from the corners of the second main pattern portion 226. The first compensating portions 218 compensate the four corner contact points Cr' of the corresponding red filtering unit 210, while the second compensating portions 228 compensate the four corner contact points Cg' of the corresponding green filtering units 220. Therefore, the first pattern 212, the second pattern 222 and the third pattern 232 (not shown in FIG. 4) together compensate all corner contact points at the junctions of adjacent filtering units 210, 220 and 230 and result in smooth coupling between the filtering units 210, 220 and 230.

Figure 5:
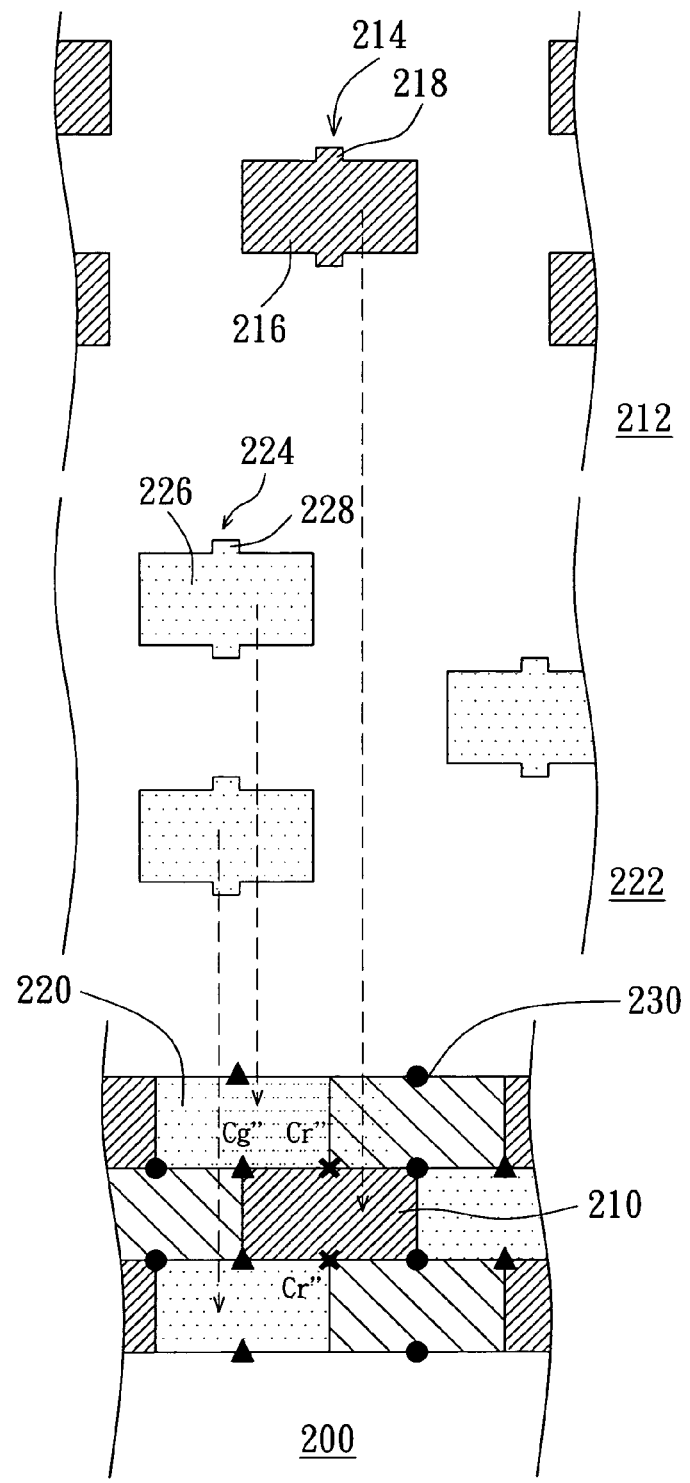
FIG. 5 is another schematic diagram of a color filter using first compensating portions of the first mask and second compensating portions of the second mask to achieve smooth junctions of adjacent filter units.

Alternatively, as shown in FIG. 5, each of first patterns 214 can only comprise two compensating portions 218 projecting from two lateral sides of the first main pattern portion 216, while each of the second patterns 224 can comprise a second main pattern portion 226 and two second compensating portions 228 projecting from two lateral sides of the second main pattern portion 226. The first compensating portions 218 compensate two corner contact points Cr" at two lateral sides of the corresponding red filtering units 210, while the second compensating portions 228 compensate the two corner contact points Cg" at two lateral sides of the corresponding green filtering units 220. Therefore, the first pattern 212, the second pattern 222 and the third pattern 232 (not shown in FIG. 5) together compensate all corner contact points at the junctions of adjacent filtering units 210, 220 and 230 and result in smooth coupling between the filtering units 210, 220 and 230.

Despite the above embodiment of the invention is exemplified by a delta-type color filter, the invention can also be applied to other types of color filters to compensate the corners between adjacent filters and provide smooth junctions. Moreover, the above embodiment is exemplified by the color filter 200 including red filtering units 210, green filtering units 220 and blue filtering units 230, however, the invention is also applicable to any filter having two filtering units. The invention can achieve smooth coupling at adjacent corners of filtering units as long as the mask pattern has compensating portions disposed thereon.

The color filter of the invention has the advantage of applying the optical proximity correction (OPC) technology to the patterning manufacturing process of the color filter. Appropriate OPC compensating portions are formed on the mask pattern to compensate the corner part of each filter, not only avoiding dimples at the corner of the filtering units and achieving an even color filter surface having filtering units coupled smoothly, but also improving the quality of the color filter and the efficiency in LCD assembly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A color filter, comprising:
   a plurality of first filtering units, manufactured according to a plurality of first patterns of a first mask, wherein each of the first patterns comprises a first main pattern portion and a plurality of first compensating portions; and
   a plurality of second filtering units, manufactured according a plurality of second patterns of a second mask;

wherein the first compensating portions enable each of the first filtering units to be smoothly coupled with the second filtering units adjacent thereto.

2. The color filter according to claim 1, wherein the first compensating portions of each first pattern project from the corresponding first main pattern portion, and correspond to a plurality of corner contact points formed between the corresponding first filtering unit and the second filtering units adjacent thereto.

3. The color filter according to claim 1, wherein the first compensating portions project from corners of the corresponding first main pattern portion.

4. The color filter according to claim 1, wherein the first compensating portions project from lateral sides of the corresponding first main pattern portion.

5. The color filter according to claim 1, wherein the first pattern is the same with the second pattern.

6. The color filter according to claim 1, further comprising:
    a plurality of third filtering units, manufactured according to a plurality of third patterns of a third mask, wherein the first filtering units, the second filtering units and the third filtering units are arranged in a delta form.

7. The color filter according to claim 1, further comprising:
    a plurality of third filtering units, manufactured according to a plurality of third patterns of a third mask, wherein the first compensating portions enable each of the first filtering units to be coupled smoothly with the adjacent second filtering units and the adjacent third filtering units.

8. The color filter according to claim 7, wherein the first compensating portions project from the four corners and two opposite lateral sides of the corresponding first main pattern portion.

9. The color filter according to claim 7, wherein each of the second patterns further comprises a second main pattern portion and a plurality of second compensating portions, wherein the second compensating portions enable each of the second filtering units to be smoothly coupled with the adjacent first filtering units and the adjacent third filtering units.

10. The color filter according to claim 9, wherein the second compensating portions project from corners of the corresponding second main pattern portion.

11. The color filter according to claim 9, wherein the second compensating portions project from lateral sides of the corresponding second main pattern portion.

12. A manufacturing method of a color filter, wherein the color filter comprises a plurality of first filtering units and second filtering units, the manufacturing method comprises:
    using a plurality of first patterns of a first masks to pattern a first photo-resist to form the first filtering units, wherein each of the first patterns comprises a first main pattern portion and a plurality of first compensating portions; and
    using a plurality of second patterns of a second mask to pattern a second photo-resist to form the second filtering units;
    wherein the first compensating portions enable each of the first filtering units to be smoothly coupled with the second filtering units adjacent thereto.

13. The manufacturing method according to claim 12, wherein the first compensating portions of the first pattern project from the corresponding first main pattern portion, and correspond to a plurality of corner contact points formed between the corresponding first filtering units and the second filtering units adjacent thereto.

14. The manufacturing method according to claim 12, wherein the first compensating portions project from corners of the corresponding first main pattern portion.

15. The manufacturing method according to claim 12, wherein the first compensating portions project from lateral sides of the corresponding first main pattern portion.

16. The manufacturing method according to claim 12, wherein the first pattern is the same with the second pattern.

17. The manufacturing method according to claim 12, the color filter further comprises a plurality of third filtering units, the manufacturing method further comprises:
    using a plurality of third patterns of a third masks to pattern a third photo-resist to form the third filtering units, wherein the first filtering units, the second filtering units and the third filtering units are arranged in a delta form.

18. The manufacturing method according to claim 12, wherein the first photo-resist is formed through a negative photo-resist process.

19. The manufacturing method according to claim 12, the color filter further comprises a plurality of third filtering units, the manufacturing method further comprises:
    using a plurality of third patterns of a third mask to pattern a third photo-resist to form the third filtering units, wherein the first compensating portions enable each of the first filtering units to be smoothly coupled with the adjacent second filtering units and the adjacent third filtering units.

20. The manufacturing method according to claim 19, wherein the first compensating portions project from the four corners and two opposite lateral sides of the first corresponding main pattern portion.

21. The manufacturing method according to claim 19, wherein each of the second patterns further comprises a second main pattern portion and a plurality of second compensating portions, and the second compensating portions enable each of the second filtering units to be smoothly coupled with the adjacent first filtering units and the adjacent third filtering units.

22. The manufacturing method according to claim 21, wherein the second compensating portions project from corners of the corresponding second main pattern portion.

23. The manufacturing method according to claim 21, wherein the second compensating portions project from lateral sides of the corresponding second main pattern portion.

* * * * *